US 9,637,320 B2

(12) United States Patent
Moretto

(10) Patent No.: US 9,637,320 B2
(45) Date of Patent: May 2, 2017

(54) PNEUMATIC TRANSPORT SYSTEM OF GRANULAR MATERIAL AND CONTROL METHOD OF SUCH SYSTEM

(71) Applicant: MORETTO S.p.A., Massanzago, Padua (IT)

(72) Inventor: Renato Moretto, Padua (IT)

(73) Assignee: MORETTO S.p.A., Massanzago, Padova (IT)

( * ) Notice: Subject to any disclaimer, the term of this patent is extended or adjusted under 35 U.S.C. 154(b) by 149 days.

(21) Appl. No.: 14/280,078

(22) Filed: May 16, 2014

(65) Prior Publication Data

US 2014/0348597 A1     Nov. 27, 2014

(30) Foreign Application Priority Data

May 22, 2013    (IT) .............................. PD2013A0142

(51) Int. Cl.
| | |
|---|---|
| *B65G 53/24* | (2006.01) |
| *B65G 43/08* | (2006.01) |
| *B65G 53/66* | (2006.01) |
| *B65G 53/04* | (2006.01) |

(52) U.S. Cl.
CPC ............. *B65G 43/08* (2013.01); *B65G 53/04* (2013.01); *B65G 53/24* (2013.01); *B65G 53/66* (2013.01)

(58) Field of Classification Search
CPC ................................ B65G 53/24; B65G 53/26
USPC .................... 406/28, 34, 35, 50, 75, 85, 151
See application file for complete search history.

(56) References Cited

U.S. PATENT DOCUMENTS

| | | | | |
|---|---|---|---|---|
| 3,937,521 | A | * | 2/1976 | Reuter ................... B65G 53/66 34/221 |
| 4,221,507 | A | * | 9/1980 | Olney ..................... C06B 21/00 222/55 |
| 4,252,001 | A | * | 2/1981 | Musschoot ............... B22C 5/08 164/155.5 |
| 4,718,795 | A | * | 1/1988 | Dugge .................. B65G 53/66 406/30 |

(Continued)

FOREIGN PATENT DOCUMENTS

| | | |
|---|---|---|
| EP | 2 003 075 A1 | 12/2008 |
| GB | 884 231 A | 12/1961 |

OTHER PUBLICATIONS

Italian Search Report for corresponding Italian Patent Application No. PD2013A000142 mailed Jan. 23, 2014.

*Primary Examiner* — Joseph Dillon, Jr.
(74) *Attorney, Agent, or Firm* — Merchant & Gould P.C.

(57) ABSTRACT

A control method and pneumatic transport system of granular material, conveys granular material from storage containers to processing machines includes at least one loading device of the granular material with a collection tank of the granular material; at least one granular material conveying duct fluidly connecting the collection tank to at least one container; and a granular material flow generator inside the conveying duct. For each loading device at least one sensor detects vibrations induced by the material being loaded inside the loading device. The sensor is arranged at or near the loading device and generates time signals of the vibrations that may be correlated to the granular material mass being progressively loaded in the tank or to the volume of the tank being progressively filled by the granular material.

15 Claims, 7 Drawing Sheets

(56) References Cited

U.S. PATENT DOCUMENTS

| | | | | |
|---|---|---|---|---|
| 4,844,663 | A * | 7/1989 | Salter | B01J 3/02 406/12 |
| 4,907,892 | A * | 3/1990 | Paul | B01F 13/0244 366/101 |
| 5,378,089 | A * | 1/1995 | Law | B01J 4/00 406/123 |
| 5,558,472 | A * | 9/1996 | Ogawa | B01J 8/0015 406/12 |
| 6,287,056 | B1 * | 9/2001 | Szikszay | B65G 53/12 406/127 |
| 6,379,086 | B1 * | 4/2002 | Goth | B29C 47/10 406/130 |
| 6,588,988 | B2 * | 7/2003 | Zlotos | B65G 53/24 406/14 |
| 6,720,393 | B1 * | 4/2004 | George | C08F 10/00 422/109 |
| 7,228,990 | B2 * | 6/2007 | Schmidt | B28C 5/40 141/83 |
| 8,113,745 | B2 * | 2/2012 | Aoki | B65G 53/525 406/126 |
| 8,491,228 | B2 * | 7/2013 | Snowdon | B01J 8/0025 406/14 |
| 9,187,267 | B2 * | 11/2015 | Abramov | B65G 53/26 |
| 2009/0304461 | A1 * | 12/2009 | Strohschein | B65G 53/54 406/11 |
| 2010/0021248 | A1 * | 1/2010 | Aoki | B65G 53/525 406/31 |
| 2011/0036758 | A1 * | 2/2011 | Kim | B03C 3/30 209/4 |
| 2011/0103901 | A1 * | 5/2011 | Hetcher | B60P 1/60 406/39 |
| 2011/0162666 | A1 * | 7/2011 | Jahnke | A24B 1/04 131/290 |
| 2014/0042060 | A1 * | 2/2014 | Stevenson | C10G 1/045 208/390 |
| 2015/0259123 | A1 * | 9/2015 | Araki | G03G 9/0804 206/205 |
| 2016/0122042 | A1 * | 5/2016 | Breulmann | B65B 39/007 53/473 |

* cited by examiner

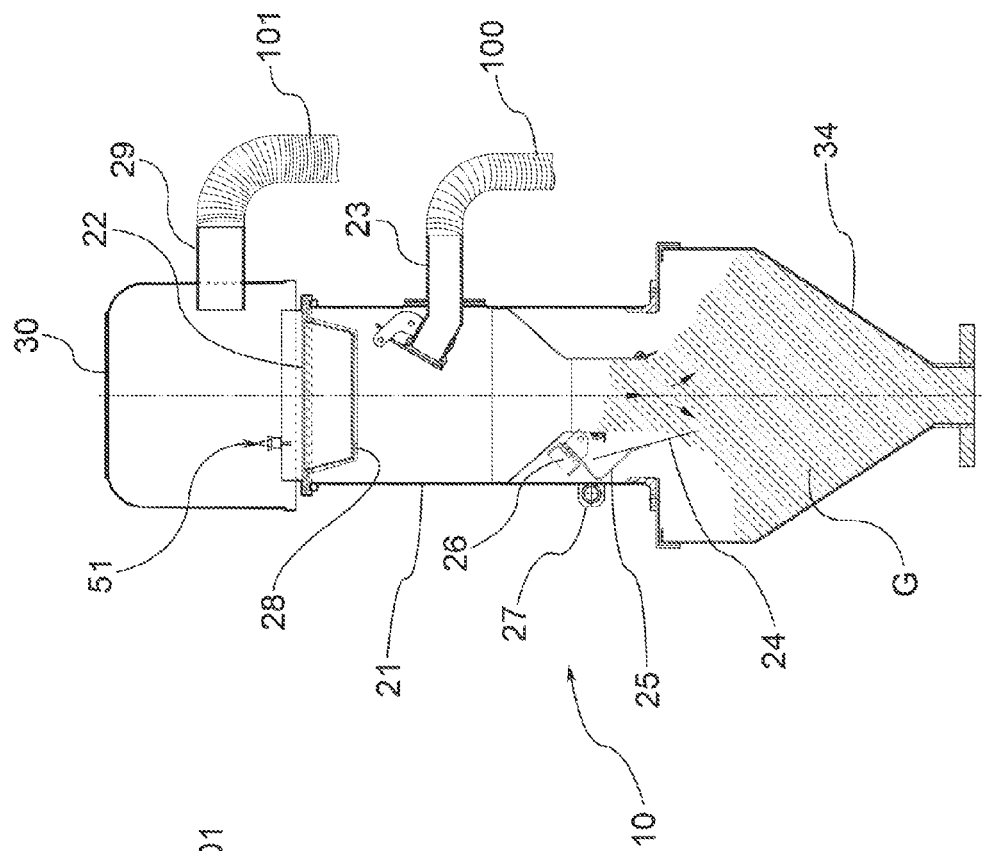
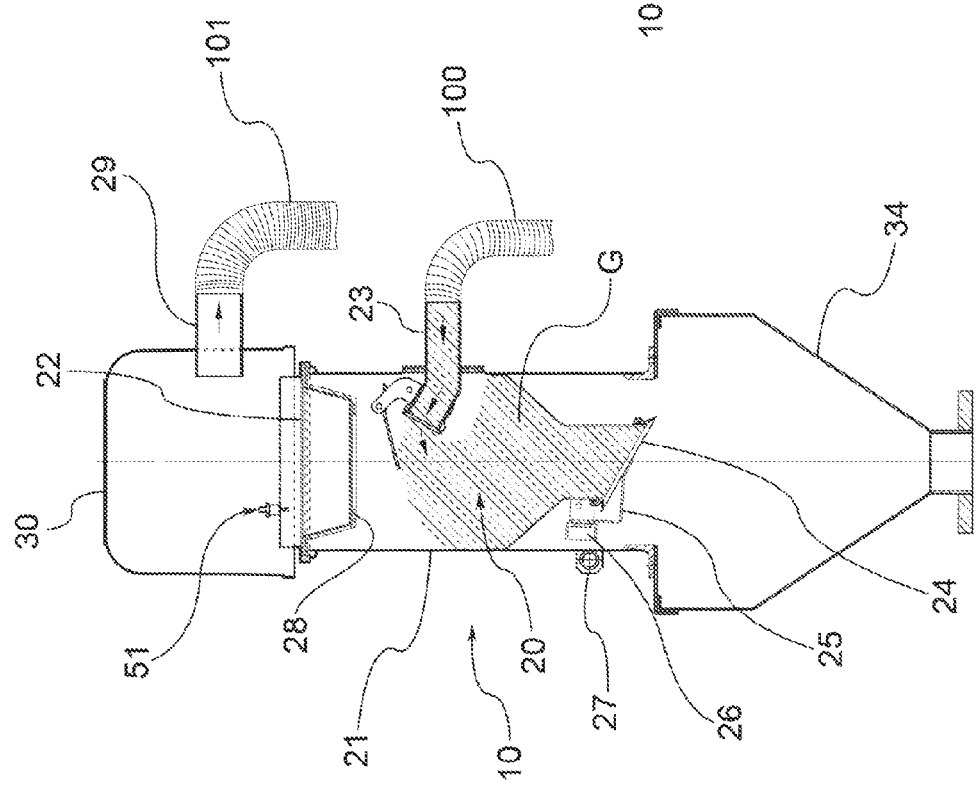

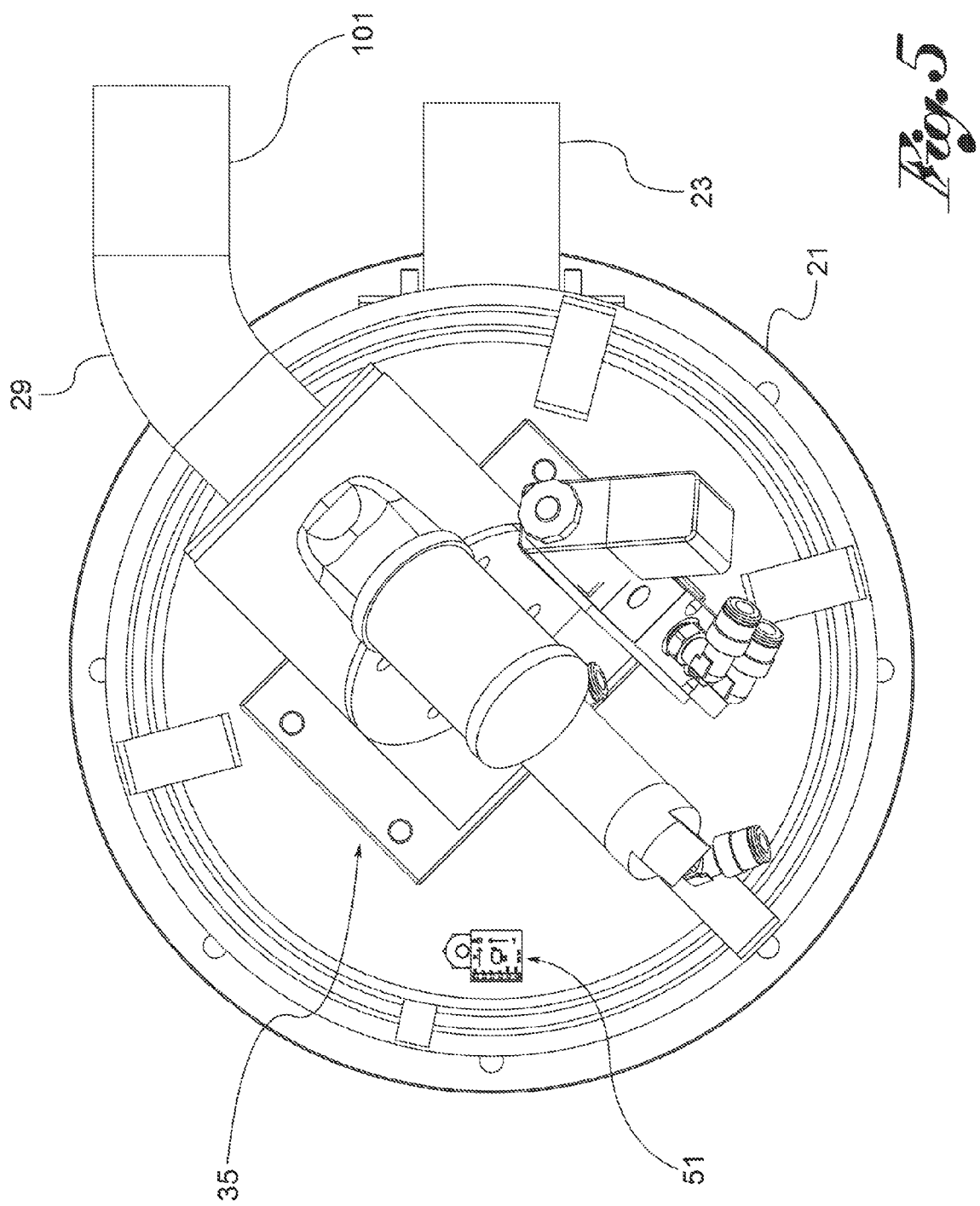

PNEUMATIC TRANSPORT SYSTEM OF GRANULAR MATERIAL AND CONTROL METHOD OF SUCH SYSTEM

This application claims benefit of Serial No. PD2013A000142, filed 22 May 2013 in Italy and which application is incorporated herein by reference. To the extent appropriate, a claim of priority is made to the above disclosed application.

FIELD OF THE INVENTION

The object of the present invention is a transport system of granular material and a control method of such system. In particular, the system is intended for processing granular plastic material.

BACKGROUND OF THE INVENTION

In systems for processing and/or transforming granulated plastic materials, the granular material is transported from a storage container to one or more processing machines, usually consisting of injection or thermoforming presses, by means of a conveying or pneumatic transport system, preferably operating under vacuum.

A vacuum pneumatic transport system comprises at least one loading device of the granular material directly associated with a processing machine, a duct which connects a storage container of the granular plastic material to the above-mentioned loading device and at least one vacuum source. The handling of the granular material from the storage container to the loading device is carried out thanks to the vacuum generated in the duct of the above-mentioned vacuum source, for example a blower or a vacuum compressor.

In the jargon of the art, the loading device is referred to as "feeder" when the vacuum source is integrated into the loading device itself. This solution is adopted in the case of pneumatic transport systems of the "local" type that is systems which associate to each machine a single storage container of granular material, located at a short distance. On the other hand, the loading device is referred to as "receiver", when the vacuum source is separated therefrom. This latter solution is adopted in the case of pneumatic transport systems of the "centralized" type, that is a system which may allow fluidly connecting at different times the same machine (with the loading device thereof) to different storage containers even located at distances of 100 meters.

Operatively, under the action of the vacuum source, the granular material is drawn from the storage container to later reach—transported by the air drawn along the above-mentioned (referred to as suction or conveying) duct—the collection tank of the loading device, from which—once the loading of the tank is complete—it is put into the processing machine. On the other hand, the transport air is drawn by the loading device to be conveyed towards the vacuum source (in the case of the receiver) or directly ejected outwards (in the case of the feeder). Between the collection tank of the loading device and the vacuum source there is arranged a filter adapted for filtering the air which has just separated from most of the granular material, before it reaches the vacuum source. Generally, the filter is integrated into the loading device, be it a feeder or a receiver.

The control of the transport system is essentially aimed at adjusting the filling of the collection tank of the loading device and, that is, the quantity of granular material to be fed to the processing machine. Generally, the filled level of the collection tank (and therefore the quantity of loaded material) is estimated and thus controlled optimising the filling time of the tank.

In the case of pneumatic transport systems of the "local" type, the filling step coincides with the suction step. In the case of pneumatic transport systems of the centralized type, the filling step comprises a suction or filling step (i.e. withdrawal step of the material directly from the storage container) and a duct cleaning step.

In the case of pneumatic transport systems of the centralized type, wherein the conveying ducts may have lengths of even 100 meters, there is, in fact, an actual risk for the granular material to accumulate along the ducts (for example at the curves), with the formation of clogs which often lead to a shut-down of the system. At each filling cycle it is therefore convenient that the suction duct is cleaned, to avoid not only the formation of clogs of material, but also any contaminations between different materials, if different materials are fed to the same machine going from one cycle to the other. During the cleaning step of the duct, the granular material collected along the duct is sent to the tank and adds to that already conveyed therein during the suction step.

In conventional systems, the operator manually sets up the parameters to optimise the operation of the pneumatic transport system.

The duration of the filling cycle is normally set by the operator such that the sum of the suction and duct cleaning times corresponds to the total time for the optimized filling of the receiver. This is performed so as to avoid that the suction duct of the material is clogged with granules because of an excessive loading or vice versa that the receiver is not fully loaded, thus decreasing the efficiency. If a cleaning step is not provided, the duration of the filling cycle is normally set so that the sum of the suction times corresponds to the total time for the optimised filling of the receiver.

The assessment of the above-mentioned time values, i.e. suction time, and cleaning time if any, takes place by means of a series of empirical tests carried out by the operator during the system start-up, with a consequent waste of both material and time.

Furthermore, it should be noted that if there is a change of material, the operator will have to change again the parameters of the suction and cleaning cycle, by changing times, based on further tests.

Further, if the demand of material by the processing machine associated with the receiver/feeder is lower than that set during the system start-up, for example because of a reduction of hourly production, the operator will have to modify the system parameters again.

It is, therefore, apparent that the optimisation of the filling times of the collection tank is one of the most difficult problems to solve in the pneumatic transport of granular plastic material through conveying ducts.

As disclosed above, the problem is further complicated by the variability of the conditions surrounding the pneumatic transport system. In fact, over time, there may arise, for example, variations of the degree of clogging of the filter, fluidisation, grain size and rheological properties of the material. Accordingly, the parameters set up by the operator for the optimisation of the transport system have to be changed again by trial and error.

In the prior art, optical level devices are already known that are arranged inside the collection tank of the receiver/feeder to detect the reaching of a predetermined filled level. Such optical devices allow to significantly reduce the times ad quantities of materials required in the step of system start-up, but do not allow to adjust the filling times when operating variations occur, for example connected to variations of hourly production. These are, in fact, optical level sensors arranged in a fixed position. Furthermore, such optical devices are significantly affected by the quantity of powder transported, by the colour of the granules, and are also subjected to fouling events. Globally, these are not particularly reliable.

Alternatively to the optical devices, weighing devices have been proposed, consisting for example of loading cells that are arranged at the base of the receiver and determine a filled level of the container based on the detected weight of loaded material. Neither these loading devices are particularly reliable, especially when the quantities to detect are of a few kilograms. In fact, these are very susceptible to vibrations. A pneumatic transport system of material is continuously subjected to vibrations. Suffice it to mention the vibrations induced during the various loading cycles of the granular material. Inside the piping and especially in the receivers/feeders, because of the vacuum and the impact of the granular material on the inner surface of the receivers/feeders, there may occur even very strong vibrations which actually prevent a correct and reliable measurement of the quantity of material loaded in the tank.

Lastly, it should be noted that the operating life cycle of the above-mentioned weighing devices is limited. In fact, over time the vibrations of the transport system tend to easily cause damage to the strain gauges with which such devices are provided.

SUMMARY OF THE INVENTION

Therefore, the object of the present invention is to eliminate the drawbacks of the prior art described above, by providing a pneumatic transport system of granular material and a control method of such system, which allow to automatically adjust the filling of the tank of one or more loading devices in an efficient manner upon changing of the operating conditions.

A further object of the present invention is to provide a pneumatic transport system of granular material and a control method of such system, which allows to significantly reduce the operating costs with respect to conventional systems.

A further object of the present invention is to provide a pneumatic transport system of granular material, which is simple and inexpensive to make.

BRIEF DESCRIPTION OF THE DRAWINGS

The technical features of the invention, according to the above objects, and the advantages of the same will appear more clearly from the following detailed description, made with reference to the annexed drawings, which show one or more purely exemplifying and non-limiting embodiments thereof, wherein:

FIGS. 4*a* and 4*b* each show a schematic cross-sectional view of a detail of the systems illustrated in FIGS. 1 and 2, relating to a loading device (receiver) of a transport system according to a first particular embodiment of the invention, illustrated in a loading set-up and a discharging set-up, respectively, of the granular material;

FIG. 5 is an elevated view of the loading device of FIGS. 4*a* and 4*b*, illustrated without the upper head;

DETAILED DESCRIPTION

The present invention relates to both a transport system of granular material and a control method of such a type of system.

In particular, the granular material is a plastic material. The terms "granular" or "granules" are meant to generally include materials of any shape, not only in the form of granules or powder, but also in the form of flakes, scales, small tabs or plates produced, for example, by the grinding-crushing of plastic material in the form of a slab, sheet, foil, film or the like.

For simplicity of description, the system first and the control method later according to the invention will now be described.

The pneumatic transport system 1 according to the invention is destined for conveying granular material from one or more storage containers T to one or more processing machines M within the scope of a more complex processing system.

Figure 1:
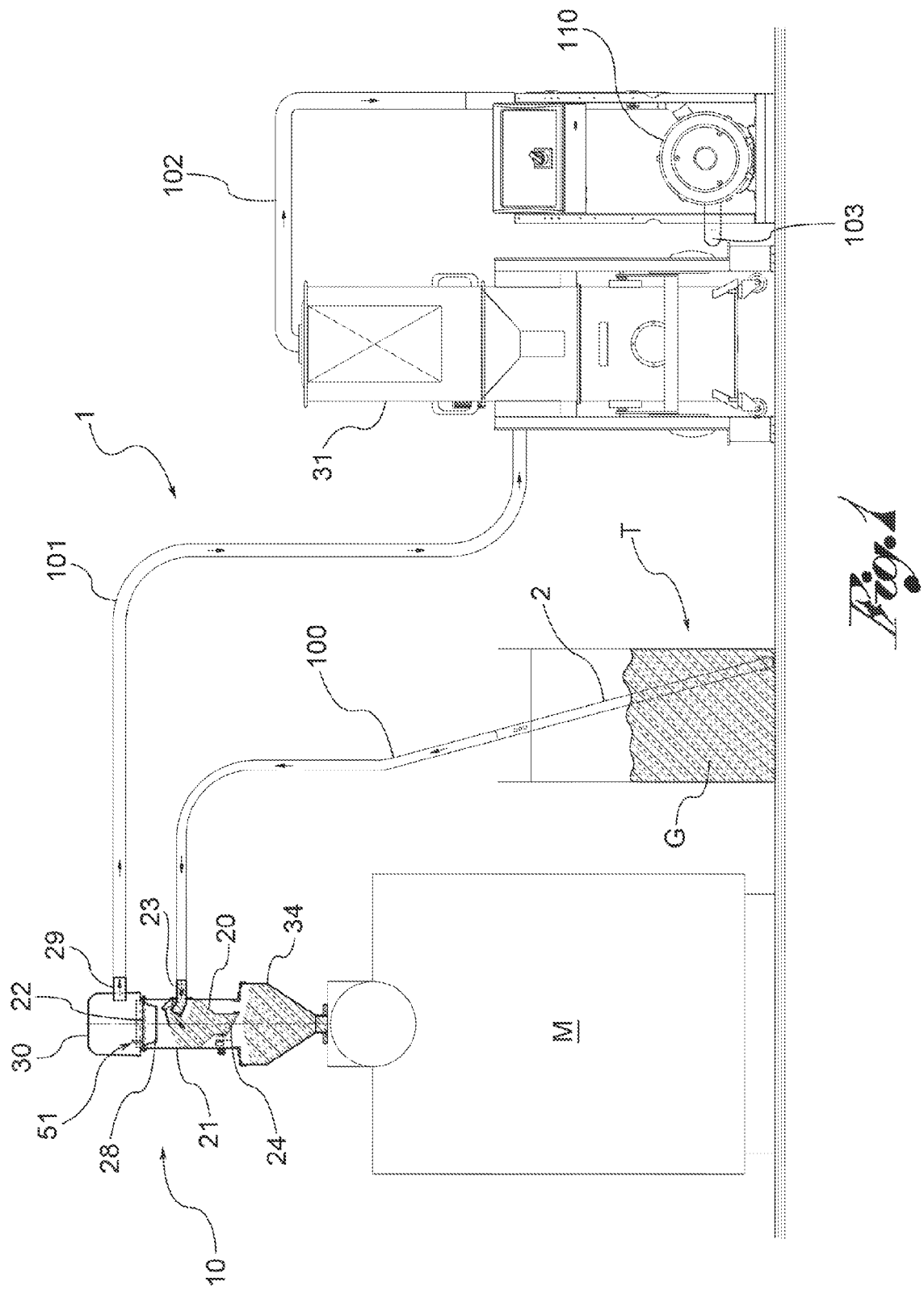
FIG. 1 shows a simplified diagram of a system for processing granular plastic materials with a transport system under vacuum according to the invention.
Figure 2:
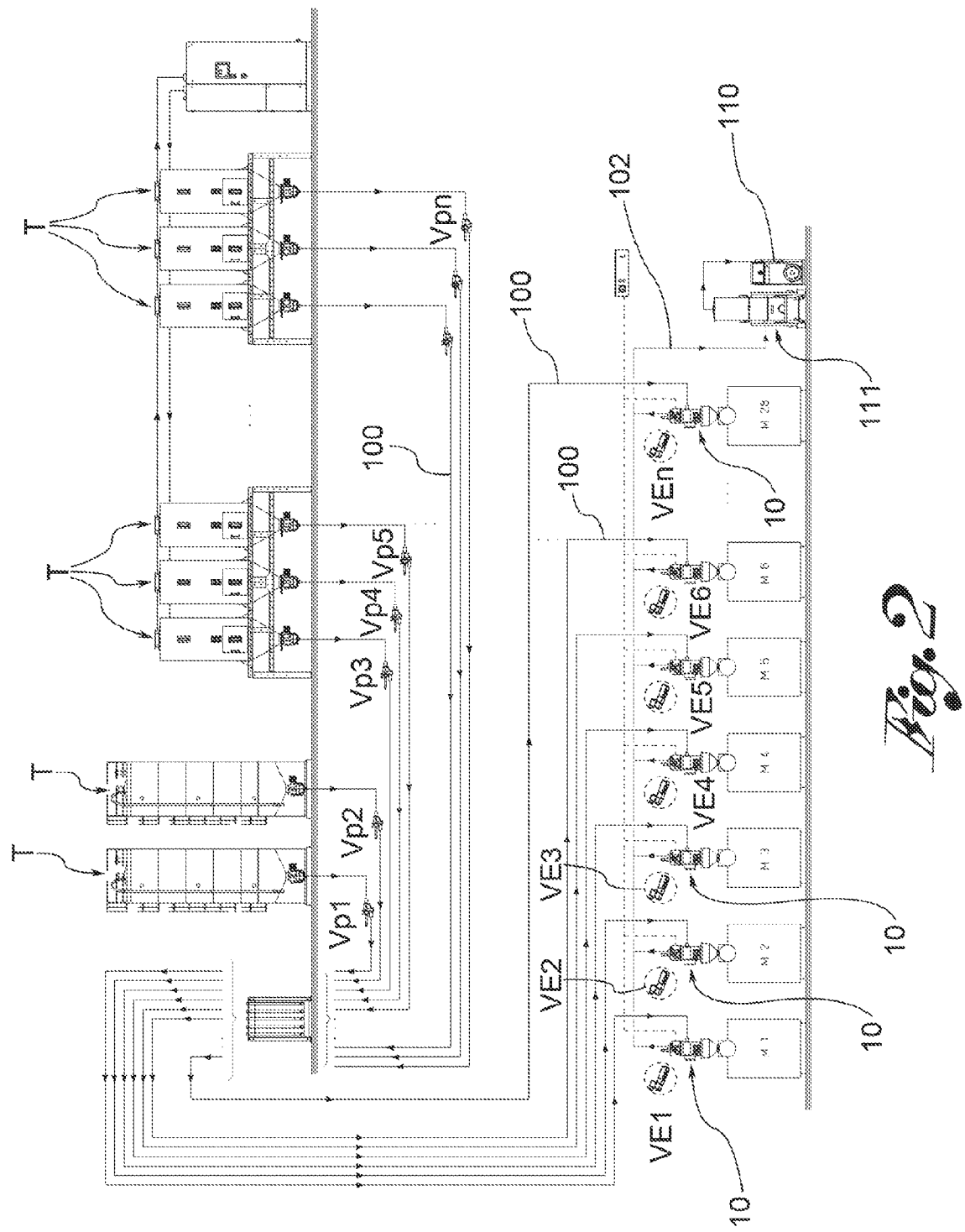
FIG. 2 shows a simplified diagram of a schematic view of a system for processing granular plastic materials with multiple sources of granular material and multiple processing machines, provided with a transport system under vacuum of the centralized type according to the invention.

According to a general embodiment of the invention, as illustrated in FIGS. 1 and 2, the pneumatic transport system 1 comprises:

at least one loading device 10 of the granular material, to be associated to a processing machine M to feed it with granular material, said device being provided with a collection tank 20 of the granular material;

at least one conveying duct 100 of granular material which fluidically connects the collection tank to at least one storage container T of granular material to transfer such material from the container to such tank; and means 110, 35 for generating inside the conveying duct 100 a flow of granular material from the container T to the tank 20 of the loading device.

Preferably, the pneumatic transport system 1 is of the under vacuum type. In this case the means for generating the flow comprise one or more vacuum generation devices, such as for example a blower or a vacuum compressor. The means for generating the flow also comprise valve means (which will be described hereinafter) suitably arranged to allow the creation or the interruption of vacuum along the ducts. In particular, the means for generating vacuum may comprise one or more vacuum breaker valves 35, as will be described hereinafter.

Embodiments wherein the system in under pressure may also be provided.

The transport system 1 may be both of the "local" type, that is constructed to connect one single processing machine to one single storage container, and of the centralised "type", that is constructed to connect two or more processing machines to two or more storage containers, as illustrated in particular in FIG. 2.

The loading device 10 may consist of both a feeder and a receiver.

For purposes of description completeness, two examples of processing systems of granular material are described in detail below, wherein pneumatic transport systems under vacuum are integrated, manufactured according to particular embodiments of the present invention.

As illustrated in FIG. 1, the processing system comprises a storage container T of granular material G to be transferred to a processing machine M. The pneumatic transport system 1 comprises a fluidifying lance 2 which draws in the granular material G, consisting, for example, of a substantially rigid pipe, aimed at catching granules of material and mixing them with air. The lance 2 is in a fluid communication with an end of a conveying duct 100, which may be of both the rigid and the flexible type and whose end penetrates an intermediate portion of a tightly sealed loading device 10 (in this specific case, a receiver) and defines a discharge outlet. Inside the loading device 10, at a lower level than that of the discharge outlet, a collection tank 20 of the granular material is installed.

Preferably, the tank 20 consists of a dosing hopper provided with a lower discharge outlet which may be opened and closed by a bottom supported by a projecting arm in order to oscillate around a horizontal axis. As illustrated in particular in FIGS. 4a and 4b, the swivel equipment, made up of the bottom 24 and the support arm 25, is provided with a counterweight 26 which encloses a magnet and an electromagnetic alignment sensor 27. When there is no granular material in the dosing hopper 20, the bottom automatically closes the discharge outlet of the hopper 20, thanks to the presence of the counterweight 26 and of vacuum. The magnet enclosed in the counterweight aligns to the magnetic sensor 27 generating an electrical signal, which is sent to an electronic control unit. The transport air of the granular material G coming from the container T separates from the granular material falling within the tank 20 and is drawn, optionally through a first filter 28, from an outlet 29 which is made in the upper portion or head 30 of the receiver 10 and is in fluid communication with an end of a duct 101. The other end of the duct 101 leads to a cyclone filtering assembly 31. From the cyclone filtering assembly 31 a further flexible duct 102 departs which is connected to a vacuum source 110, typically at the suction outlet of a vacuum pump or a blower, which provides for the ejection of the air drawn through the ducts 100, 101 and 102 directly in the ambient air, for example by a duct 103.

If the vacuum pump or blower 110 stops, the discharge outlet of the hopper 20 opens—by the effect of the lack of vacuum and the weight of the granular material contained therein—allowing the granular material to be discharged in an underlying feeding hopper 34 of the machine M.

When the magnet contained in the counterweight 26 aligns to the magnetic sensor 26 an electrical control signal is generated which is sent to the switchboard 33 of the blower or vacuum pump 110, which is thus actuated giving rise to a new feeding cycle of granular material. The cycle is timed and is modified by the operator depending on the dimensions of the receiver 10, on its distance from the container and/or on the type of granular material to transport.

With a pneumatic transport system of the type described hereinabove it is possible to carry out the transport of granular material up to distances of 200 m to even supply multiple processing machines of granular plastic materials. Such system may therefore be used to manufacture a transport system of the centralized type.

An example of a processing system with a centralized transport system under vacuum is illustrated in FIG. 2. There are provided n processing machines M1-Mn, each provided with its own loading device 10 (consisting of a receiver), and a plurality of storage containers T of material (for example silos), which may contain different granular materials. There is provided a single suction unit (pump or blower) 110 and a cyclone filtering assembly 111 located upstream of the suction unit 110. The various receivers 10 are in fluid communication with the filtering assembly 111 by means of a common duct 102, in jargon referred to as "vacuum line". Each receiver is in fluid communication with the different storage containers by means of a conveying duct 100. The system is provided with a switching apparatus of the conveying lines so that it is possible to connect the conveying line of a receiver to different storage containers alternatively.

Preferably, the receivers 10 are each provided with an on-off valve 35 (referred to as vacuum breaker) located inside the respective head 10. As already mentioned, the vacuum breaker valve 35 is part of the above-mentioned means for generating vacuum, and as such may be piloted in combination with or as an alternative to the vacuum source 110 (blower or pump) to activate or suspend the flow of material towards the loading device 10. The vacuum breaker valve 35 may be piloted by a respective electro-pneumatic valve VE1,VEn in turn controlled by a suitable electronic control unit (not illustrated in the Figures) aimed at managing each area of the system, in particular providing for the actuation of one receiver first and then the other depending on the operating requirements.

Figure 3:
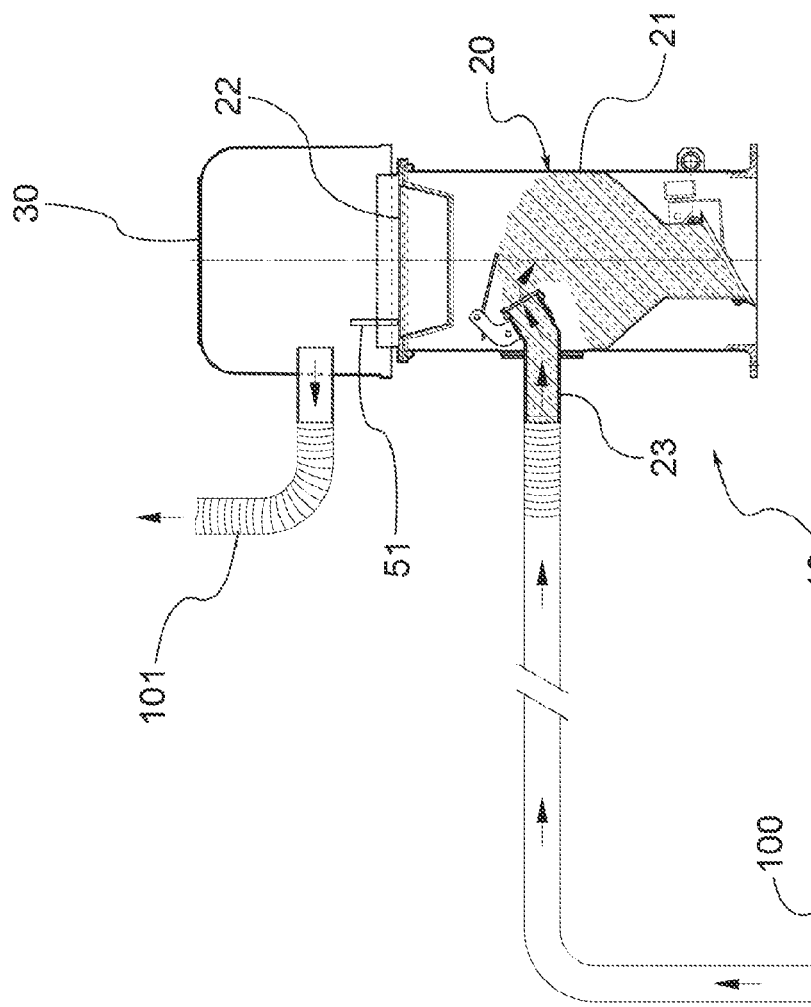
FIG. 3 shows an enlarged scale view of a detail of the systems illustrated in FIGS. 1 and 2, relating to a cleaning valve of the conveying ducts of the granular material.

At each cycle, the conveying line 100 is affected by a predetermined amount of air and of granular material and at the end of each cycle it is completely discharged of granular material, thanks to the presence of an intercepting device, referred to as "duct cleaning valve", Vp1, . . . , Vpn, provided for each receiver, so that when the suction unit 110 stops or the vacuum breaker valve 25 is actuated for the receiver of interest, the conveying line 100 is emptied. FIG. 3 shown a typical cleaning valve referred to as VP1 inserted in the conveying duct 100 of a respective receiver 10. The construction and operation of such vacuum breaker valve are well known to a person skilled in the art. Therefore, a detailed description is not provided.

According to the present invention, the pneumatic transport system 1 comprises for each loading device (be it a receiver or a feeder) at least one sensor 51, 52 to detect the vibrations induced by the material which is being loaded into the loading device 10.

Figure 6:
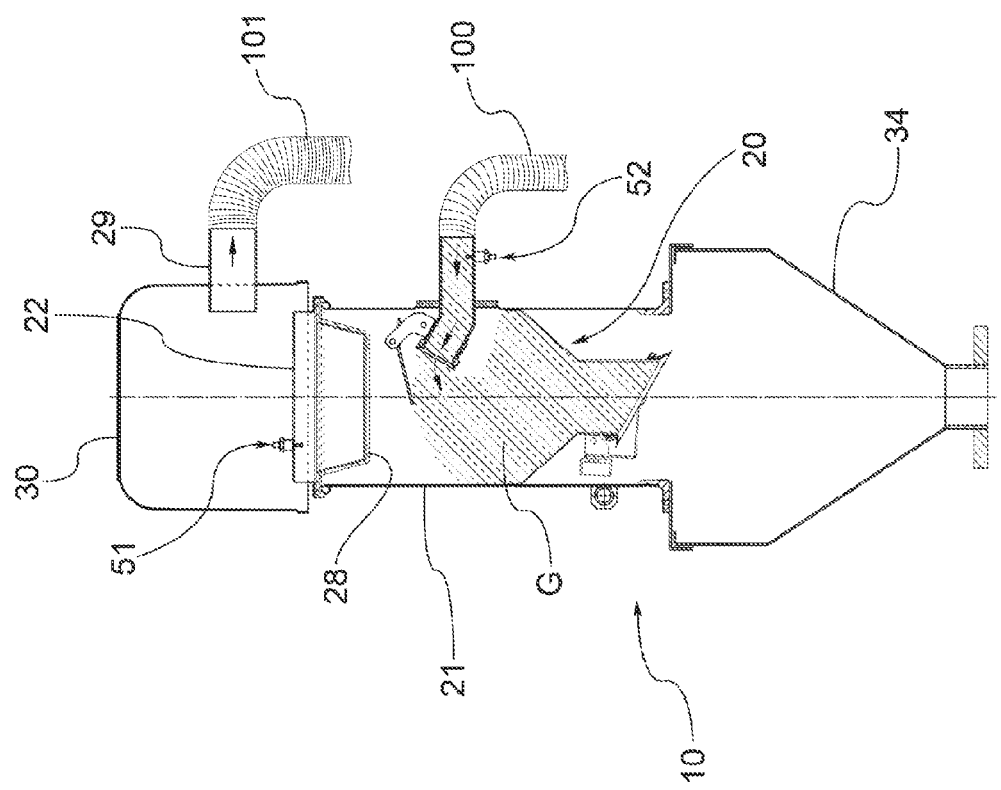
FIGS. 6 and 7 each show a schematic cross-sectional view of a detail of the systems illustrated in FIGS. 1 and 2, relating to a loading device (receiver) of a transport system according to two different particular embodiments of the invention.
Figure 7:
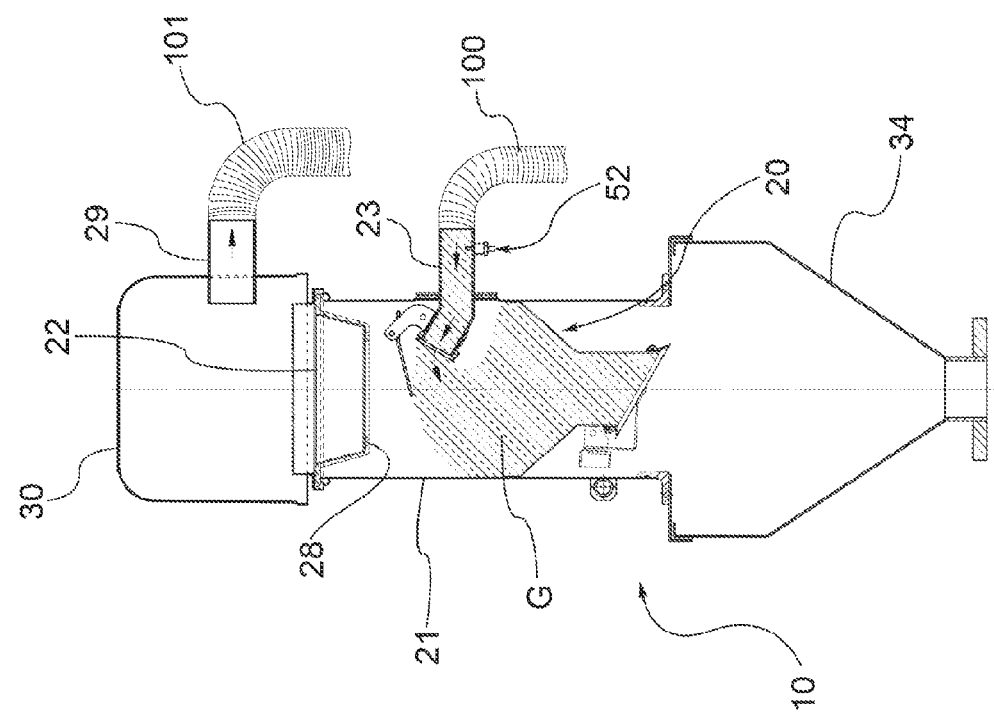

As illustrated in particular in FIGS. 4, 6 and 7 such at least one sensor 51, 52 is arranged at the loading device 10. The sensor 51, 52 may also be arranged in the proximity of the loading device 10, provided that the sensor is capable of detecting the vibrations induced on the loading device by the granular material which is being loaded into the device itself.

Such sensor 51, 52 generates time signals of the vibrations which—as will be further explained hereinafter by describing the method according to the present invention—may be correlated to the mass of granular material which is being progressively loaded into the collection tank 20.

Alternatively, such sensor 51, 52 generates time signals of the vibrations which may be correlated to the volumes of the collection tank 20 being progressively filled with granular material.

Preferably, the transport system 1 comprises at least one electronic control unit (not illustrated in the annexed Figures) which is connected to at least one sensor 51, 52 to receive time signals of the vibrations generated therefrom.

Operatively, the electronic control unit progressively estimates over time the filled level of the collection tank 20 of the loading device, correlating to the above-mentioned signals the mass of granular material G loaded in the tank 20 by means of a modal analysis of the same signals, as will be further explained in the following description.

Alternatively, the electronic control unit estimates progressively over time the filled level of the collection tank 20 of the loading device, correlating to the above-mentioned signals the volume of the collection tank 20 being progressively filled with the granular material depending on variations of frequency and/or amplitude of such signals.

In particular, the electronic control unit controls the flow generating means 110, 35 to activate or suspend the flow of material towards the loading device depending on the estimated filled level of the tank so as to optimise the filling time of the tank.

Advantageously, if the transport system requires a cleaning step of the conveying duct, the electronic control unit optimises the filling time of the tank 20 dividing it into one or more loading steps of the granular material, wherein the material conveyed to the tank is taken directly from the storage container T, and one or more cleaning steps of the conveyor duct 100, wherein the material conveyed to the tank is composed of any residues remaining in the conveying duct.

Advantageously, the electronic control unit may store—for each filling cycle—the total filling time of the collection tank, the time of the loading step and/or the time of the cleaning step, so as to create a set of statistical parameters. The control unit may therefore generate an alarm signal whenever one or more of the filling time, the loading time and/or the cleaning time in a specific cycle do not fall within the above-mentioned statistical parameters.

The above-mentioned at least one sensor 51, 52 may be arranged in any position, provided that it is at or in the proximity of the loading device 10, with the above described clarification.

Preferably, the sensor 51, 52 is arranged on the outside, and not on the inside, of the collection tank to prevent it from being directly hit by the granular material. This may reduce its measurement accuracy.

In particular, the above-mentioned at least one sensor 51, 52 may be connected to a containment wall 21 of the collection tank 20 of the loading device, for example on the lateral wall (in particular being cylindrical in shape).

The sensor may also be directly installed in the electronic control board of the loading device.

Advantageously, the loading device 10 is provided with an upper lid 22 closing the collection tank. Such lid separates the collection tank from the upper portion of the loading device (known in the jargon as upper head and indicated as 30 in the figures). In particular, such lid may carry a filter 28. As illustrated in FIGS. 4a, 4b and 5, the above-mentioned at least one sensor 51, 52 may be connected to the lid 22. Preferably, the sensor 51 is arranged on the side of the lid 22 facing the head 30 that is inside the volume defined by the head 30.

Advantageously, the loading device 10 is provided with a tubular element 23 which allows the connection with the conveying duct 100. In particular, such connector element 23 passes through a wall of the collection tank 20 and is attached thereto. As illustrated in FIG. 6, the above-mentioned at least one sensor 52 may be connected to such tubular connector element 23, preferably as close as possible to the wall of the tank.

According to a particular embodiment solution, illustrated in FIG. 7, the transport system 1 may also comprise for the single loading device two or more sensors 51 and 52 for detecting vibrations, arranged at different positions in the proximity of and/or at the loading device. The use of two or more sensors allows reducing the error margin, correlating multiple signals.

According to a first embodiment, the above-mentioned at least one sensor 51 or 52 may be an accelerometer. The accelerometer may be of any suitable type. In particular, it may be of the capacitive type, which takes advantage, as a principle, of the variation of electrical capacity of a condenser upon variation of the distance between the armatures thereof. In these accelerometers, the mass constitutes an armature, while the other is obtained on a fixed structure of the device, in the immediate vicinity of the mass.

According to a second embodiment, the above-mentioned at least one sensor 51 or 52 may be a velocimeter.

According to a third embodiment, the above-mentioned at least one sensor 51 or 52 may be a transducer of an electromechanical type, preferably a microphone.

As already mentioned, it is another object of the present invention a control method of a pneumatic transport system of granular material. In the description of the method, reference will be made to components of the transport system 1 already described. For simplicity of description, therefore, the same reference numerals will be used.

According to a general embodiment, such control method comprises a step a) of providing:

at least one loading device 10 of the granular material for a processing machine M; said device being provided with a collection tank 20 of the granular material;

at least one conveying duct 100 of granular material which fluidically connects the collection tank to at least one storage container T of granular material; and means 110, 35 for generating inside the conveying duct 100 a flow of granular material from the container T to the tank 20 of the loading device.

The method further comprises the following operating steps:

b) loading the tank 20 with the granular material generating a flow of granular material from the container T to the tank 20;

c) detecting by means of a sensor 51, 52 the vibrations induced on the loading device 10 by the granular material which is being loaded inside such device, generating time signals; and d) estimating progressively over time the filled level of the collection tank 20 correlating to said time signals of the vibrations the mass of granular material loaded in the tank by means of a modal analysis of said signals, or the volume of the collection tank 20 progressively filled by said granular material, on the basis of frequency and/or amplitude variations of said signals; and e) controlling the flow generating means 110, 35 to activate or suspend the flow of material towards the loading device 10 depending on the estimated filled level of the tank 20 so as to optimise the filling time of the tank.

With reference to the specific case wherein the time signals are correlated to the mass of granular material being progressively loaded, it is observed that the assembly given by the loading device and the mass of granular material being progressively loaded inside the device has one or more proper frequencies. The frequency and amplitude of such time signals of the vibrations generated by the sensor vary upon variation of the mass of loaded granular material.

Advantageously, in the step d) of estimating the filled level the mass of material being progressively loaded is estimated based on the time variations of the amplitude and/or frequency of said signals. Being the volume of the collection tank and the density of the granular material known, the filled level may be calculated from the estimated value of the mass of loaded granular material.

To better clarify the meaning of the expression "modal analysis" and the applications thereof, it appears appropriate herein to briefly explain the concept of "natural frequency".

Figure 8:
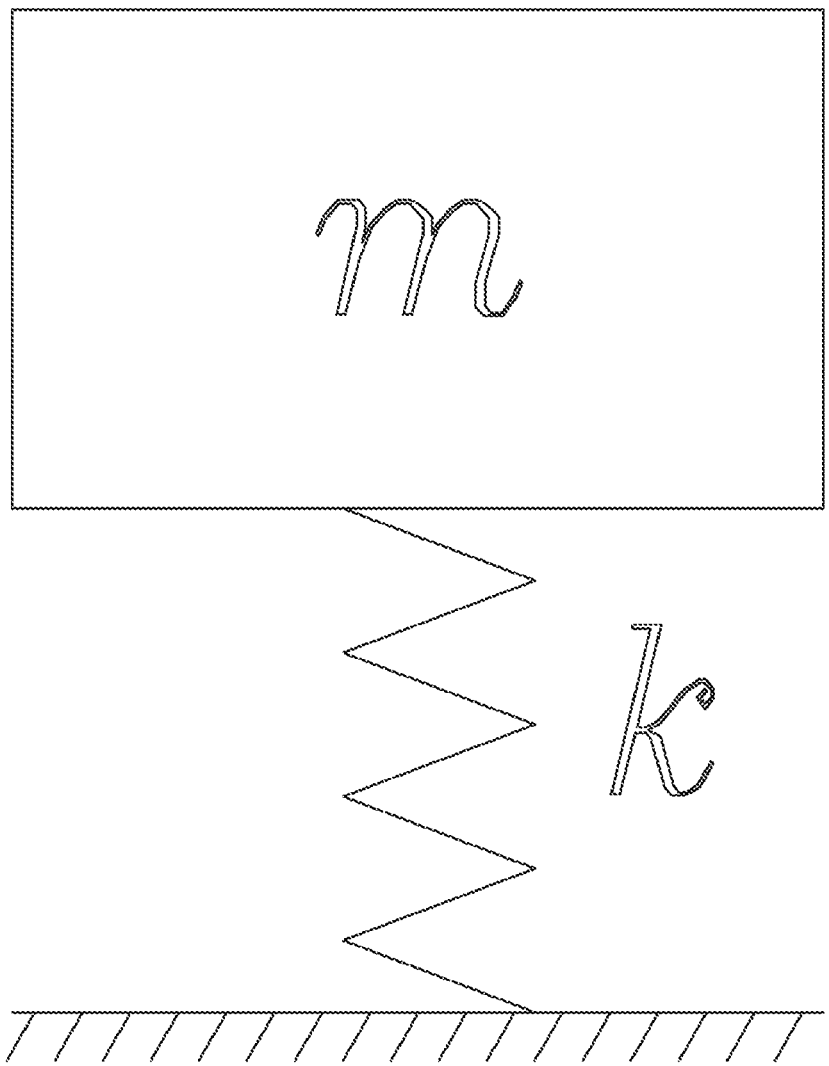
FIG. 8 illustrates a schematic view of a block diagram for the understanding of the operating principle of the present invention.

FIG. 8 shows a simple mathematical model consisting of a mass m connected to a spring with elastic constant k. The illustrated system, if stressed, starts oscillating with a well-precise frequency especially connected to the values of mass and elastic constant of the spring.

In particular, the force acting on the body is given by the following formula:

$$F(x) = -kx$$

it is in fact a return force proportional to the displacement. The equation of the motion of the body therefore is:

$$-kx(t) = m\frac{d^2 x(t)}{dt^2}$$

which may be written in the conventional form of a differential equation $$\frac{d^2 x(t)}{dt^2} + \frac{k}{m}x(t) = 0$$

The mathematical analysis shows that the general solution is as follows:

$$x(t) = A\cos(\omega t + \phi)$$

where ω is the proper pulse of the system and corresponds to:

$$\omega = \sqrt{\frac{k}{m}}$$

The speed with which the mass moves obviously corresponds to the first derivative of the general solution:

$$\dot{x}(t) = -A\omega \sin(\omega t + \phi)$$

while the acceleration is the second derivative of the general solution:

$$\ddot{x}(t) = -A\omega^2 \cos(\omega t + \phi)$$

Real objects, although more complex than the simple system illustrated herein, have similar behaviours to that just described. More specifically, they are characterised by a set of proper frequencies, each provided with the relative damping and its proper modal form.

Therefore, if the inner force acts on the structure of the loading device, caused by the impact of the granular material, it provides energy to one of these frequencies.

Obviously, in this mathematical model the damping factor has not been considered and is omitted for purposes of simplicity.

As already mentioned, according to a preferred embodiment, the sensor 51, 52 is an accelerometer. The second derivative of the general solution, which we recall being the following:

$$\ddot{x}(t) = -A\omega^2 \cos(\omega t + \phi)$$

shows how the amplitude of the signal depends on the mass composed of the receiver and the granular material:

$$\omega = \sqrt{\frac{k}{m}}.$$

Therefore, upon variation of the quantity of loaded granular material, the amplitude of the signal and the frequency of the signal vary. Operatively, by processing the signals generated by the sensor by means of a specific algorithm (implemented for example by the already mentioned electronic control unit) it is therefore possible to estimate over time the mass of granular material being loaded and therefore to also estimate the filled level of the tank.

Advantageously, when the transport system to control requires it, the method may comprise a cleaning step f) of the conveying duct 100. In this step (described hereinabove) an air flow directed towards the tank 20 is generated inside the duct to free it from any residues of material. In particular, such cleaning step f) is carried out after the loading step d).

Operatively, in the presence of a cleaning step, the filling time is optimised in the above-mentioned step e) of the method as a sum of the times of the loading step b) and the cleaning step f) of the duct.

Preferably, the method comprises a step g) of storing—for each filling cycle—the total filling time of the collection tank, the time of the loading step and/or the time of the cleaning step. In this way it is possible to create a set of statistical parameters.

Advantageously, the method may provide for a step h) of generating an alarm signal whenever one or more of the filling time, the loading time and/or the cleaning time in a specific cycle do not fall within the above-mentioned statistical parameters.

The invention allows several advantages to be achieved, some of them already described.

The present invention allows controlling and adjusting in an automated and efficient way—upon variation of the operating conditions—a pneumatic transport system. Thanks to the invention it is in fact possible to control and adjust in an automated way the filling of the collection tank of one or more loading devices, avoiding any manual operation by the operators.

Thanks to the invention the filled level of the tank may be monitored in real time. This enables a greater optimisation of the system operation. It is in fact possible to operate on the system almost immediately upon occurrence of any variation of the operating conditions.

Thanks to the invention it is possible to significantly reduce the operating costs as compared to the conventional systems. In particular, the start-up steps of a system—which normally require a set of tests carried out manually by the operators—may be carried out in an automated way by the system, in a shorter time, with less waste of material. Globally, also the system downtime is reduced.

The system according to the invention is capable of autonomously learning, without any operation by the operator, during both the start-up and normal operation.

The system may further store a set of statistical parameters related to the actual filling time of all the receivers of the pneumatic transport system. In this way, if a filling cycle has loading and/or duct cleaning times which fall outside the statistical values stored in the control unit, the system will notify an ongoing anomaly for any problems along the transport duct or of lack of material, for example by means of an alarm.

Globally, the invention does not require substantial modifications to the transport system. It may therefore be considered as simple and inexpensive to manufacture. The invention is therefore suitable for retrofitting interventions to pre-existing systems.

The invention thus conceived thus achieves the intended purposes.

Of course, in the practical embodiment thereof, it may take shapes and configurations differing from that illustrated above without departing from the present scope of protection.

Moreover, all the parts may be replaced by technically equivalent ones and the sizes, shapes and materials used may be whatever according to the requirements.

The invention claimed is:

1. A pneumatic transport system configured to convey granular material from one or more storage containers to one or more processing machines, the system comprising:
   a processing machine;
   a loading device to feed granular material to the processing machine, said loading device being provided with a granular material collection tank;
   a granular material conveying duct fluidically connecting the collection tank to a granular material storage container to transfer the granular material from the container to load the collection tank; and
   a suction unit for generating granular material flow inside the conveying duct from the container to the collection tank of the loading device;
   a sensor for the loading device to detect vibrations induced on the loading device by the granular material during loading of the granular material into the loading device, said sensor being positioned next to or aligned with the loading device and generating time signals of the vibrations having a frequency and amplitude, wherein at least one of the frequency and amplitude is correlated to mass of the granular material being progressively loaded in the collection tank, or to a volume of the collection tank progressively filled by said granular material.

2. System according to claim 1, comprising an electronic control unit, connected to said sensor to receive the time signals of the vibrations generated by said sensor, said electronic control unit estimating progressively over time a filled level of the collection tank correlating to said signals the mass of granular material loaded in the tank by a modal analysis of said signals, said electronic control unit controlling the suction unit to activate or suspend the flow of material towards the loading device depending on the estimated filled level of the tank to optimize filling time of the tank.

3. System according to claim 1, comprising an electronic control unit, connected to said sensor to receive the time signals of the vibrations generated by said sensor, said electronic control unit estimating progressively over time a filled level of the collection tank correlating to variations in the frequency and/or the amplitude of said signals the volume of the collection tank progressively filled by the granular material, said electronic control unit controlling the suction unit to activate or suspend the flow of material towards the loading device depending on the estimated filled level of the tank to optimize filling time of the tank.

4. System according to claim 2, wherein said electronic control unit optimizes the filling time of the tank dividing the filling time into one or more loading phases of the granular material, in which the material conveyed to the tank is taken directly from the storage container, and into one or more cleaning phases of the conveyor duct, in which the material conveyed to the tank is composed of any residues remaining in the conveying duct.

5. System according to claim 3, wherein said electronic control unit optimizes the filling time of the tank dividing the filling time into one or more loading phases of the granular material, in which the material conveyed to the tank is taken directly from the storage container, and into one or more cleaning phases of the conveyor duct, in which the material conveyed to the tank is composed of any residues remaining in the conveying duct.

6. System according to claim 2, wherein said electronic control unit memorizes the filling time of the collection tank for each filling cycle creating a series of statistical parameters, said control unit generating an alarm signal should the filling time in a specific cycle not fall within the statistical parameters.

7. System according to claim 3, wherein said electronic control unit memorizes the filling time of the collection tank for each filing cycle creating a series of statistical parameters, said control unit generating an alarm signal should the filling time in a specific cycle not fall within the statistical parameters.

8. System according to claim 1, wherein said sensor is connected to a containment wall of the collection tank of the loading device.

9. System according to claim 1, wherein said loading device is provided with an upper lid closing the collection tank, said sensor being connected to said lid.

10. System according to claim 1, wherein said loading device is provided with a tubular connector element with said conveying duct, said connector element crossing a wall of said collection tank and being attached to said collection tank, said sensor being connected to said tubular connector element.

11. System according to claim 1, comprising two or more sensors for detecting vibrations induced on the loading device, positioned in different positions next to and/or in correspondence of the loading device.

12. System according to claim 1, wherein said sensor is an accelerometer.

13. System according to claim 1, wherein said sensor is a velocimeter.

14. System according to claim 1, wherein said sensor is a microphone.

15. A pneumatic transport system, configured to convey granular material from one or more storage containers to one or more processing machines, the system comprising:
   a plurality of processing machines;
   a plurality of loading devices, each of the loading devices being configured to feed granular material to the processing machines, each of said loading devices being provided with a granular material collection tank;
   a granular material conveying duct fluidically connecting the collection tank to a granular material storage container to transfer the granular material from the container to progressively load the collection tank; and a suction unit for generating granular material flow inside the conveying duct from the container to the collection tank of one of the loading devices;

a sensor for each of the loading devices to detect vibrations induced on an associated one of the loading device during loading induced by the granular material which is being progressively loaded into the associated loading device, said sensor being positioned next to or aligned with the loading device and generating time signals of the vibrations having a frequency and amplitude, the system correlating the frequency and/or the amplitude to mass of the granular material being progressively loaded in the collection tank, or to a volume of the collection tank progressively filled by the granular material.

* * * * *